US 10,888,964 B2

(12) United States Patent
Lan

(10) Patent No.: US 10,888,964 B2
(45) Date of Patent: Jan. 12, 2021

(54) CHUCK MECHANISM

(71) Applicant: SANOH INDUSTRIAL CO., LTD., Tokyo (JP)

(72) Inventor: Guang Ping Lan, Koga (JP)

(73) Assignee: SANOH INDUSTRIAL CO., LTD., Tokyo (JP)

(*) Notice: Subject to any disclaimer, the term of this patent is extended or adjusted under 35 U.S.C. 154(b) by 581 days.

(21) Appl. No.: 15/566,266

(22) PCT Filed: Apr. 25, 2016

(86) PCT No.: PCT/JP2016/062890
§ 371 (c)(1),
(2) Date: Oct. 13, 2017

(87) PCT Pub. No.: WO2016/194516
PCT Pub. Date: Dec. 8, 2016

(65) Prior Publication Data
US 2018/0111236 A1 Apr. 26, 2018

(30) Foreign Application Priority Data

Jun. 5, 2015 (JP) .................................. 2015-114537

(51) Int. Cl.
*B25J 15/10* (2006.01)
*B23Q 3/06* (2006.01)
(Continued)

(52) U.S. Cl.
CPC .............. *B23Q 3/064* (2013.01); *B23Q 7/04* (2013.01); *B23Q 7/047* (2013.01); *B25J 15/10* (2013.01);
(Continued)

(58) Field of Classification Search
CPC .......... B25B 5/12; B25B 5/122; B25B 5/127; B25B 27/023; E21B 19/163; B23Q 3/064;
(Continued)

(56) References Cited

U.S. PATENT DOCUMENTS 3,370,213 A * 2/1968 Rose ....................... H02P 29/40
318/513
4,478,451 A * 10/1984 Brucher ............... B25J 15/0206
294/106
4,505,636 A * 3/1985 Sugino ................. B25J 17/0241
294/86.4

(Continued)

FOREIGN PATENT DOCUMENTS

JP S49-45554 B1 12/1974
JP S59-128338 U 8/1984
(Continued)

OTHER PUBLICATIONS

International Search Report of the International Searching Authority dated Jun. 28, 2016 for the corresponding international application No. PCT/JP2016/062890 (and English translation).

*Primary Examiner* — Orlando E Aviles
*Assistant Examiner* — Mahdi H Nejad
(74) *Attorney, Agent, or Firm* — Posz Law Group, PLC

(57) ABSTRACT

A chuck mechanism enables downsizing of the device with a simple structure, has a wide open/close width of clamps, and hardly causes a dent or scar on pipes. The chuck mechanism includes a horizontally arranged shaft, a frame, a pair of dog leg shaped link members, parallel link members, a pair of clamp members, and a swing drive mechanism.

6 Claims, 4 Drawing Sheets

(51) Int. Cl.
*B23Q 7/04* (2006.01)
*B25B 27/02* (2006.01)

(52) U.S. Cl.
CPC ...... *B23Q 2240/007* (2013.01); *B25B 27/023* (2013.01); *Y10T 29/5387* (2015.01)

(58) Field of Classification Search
CPC .... B23Q 7/04; B23Q 7/047; B23Q 2240/007; B25J 15/10; B25J 15/0266; Y10T 29/5387
USPC ........... 269/228; 29/278, 261; 294/106, 86.4
See application file for complete search history.

(56) References Cited

U.S. PATENT DOCUMENTS

| | | | | |
|---|---|---|---|---|
| 4,569,549 A | * | 2/1986 | Nakashima | B25J 15/0266 294/116 |
| 4,697,839 A | * | 10/1987 | Fischer | B25J 15/0266 294/115 |
| 5,819,386 A | * | 10/1998 | Koppe | B25B 27/023 29/261 |
| 8,622,452 B2 | * | 1/2014 | Yamaguchi | B25J 15/0028 294/106 |
| 2009/0179445 A1 | * | 7/2009 | Coville | B66C 1/425 294/106 |
| 2011/0148132 A1 | * | 6/2011 | Park | B25J 15/0266 294/106 |
| 2014/0103673 A1 | * | 4/2014 | Nammoto | B25J 13/082 294/106 |
| 2015/0183117 A1 | * | 7/2015 | Oda | B25J 15/08 414/751.1 |

FOREIGN PATENT DOCUMENTS

| | | |
|---|---|---|
| JP | S61-27606 U | 2/1986 |
| JP | H05-69373 A | 3/1993 |
| JP | H09-155782 A | 6/1997 |
| JP | 2007-301664 A | 11/2007 |
| JP | 2011-189418 A | 9/2011 |
| JP | 2013-136125 A | 7/2013 |

* cited by examiner

CHUCK MECHANISM

CROSS REFERENCE TO RELATED APPLICATIONS

This application is a U.S. national stage of International Patent Application No. PCT/JP2016/062890 filed on Apr. 25, 2016 and is based on Japanese Patent Application No. 2015-114537 filed on Jun. 5, 2015, the disclosures of which are incorporated herein by reference.

TECHNICAL FIELD

The present invention relates to a chuck mechanism, and more particularly to a chuck mechanism used for clamping pipes during pipe processing such as cutting and bending.

BACKGROUND ART

Three-jaw chucks or collet chucks have been widely used as clamps for pipes in pipe processing such as cutting and bending. The biggest issue with these chucks is that the open/close width of clamps is small so that the clamps cannot handle a variety of pipes ranging from small to large diameters, and the jaws or collets have to be changed in accordance with the pipe diameters.

Meanwhile, there are chucks with a pair of gripping members each having one end pivotally supported and arranged in an inverted V shape. The gripping members are opened and closed by rotating the gripping members around the pivot axes (PTL 1, for example). The open/close width of clamps of this chuck mechanism can be made larger easily, and the clamps can be designed to be capable of handling pipes of various diameters. However, since the gripping members of this chuck mechanism clamp a pipe by rotating around pivot axes, the gripping members cannot make surface contact with all of pipes of various diameters and sometimes make line contact, or point contact depending on the case. Therefore the load may be concentrated excessively on the pipe being clamped and sometimes a dent or scar was formed on the pipe.

A solution to the problem encountered by the chuck mechanism described above is disclosed in PTL 2. The chuck mechanism disclosed in this PTL 2 is a multi-jaw chuck including a multiplicity of circumferentially equally spaced and radially arranged clamp jaws, guide grooves that slidably guide the clamp jaws in the radial direction, an annular cylinder to which compressed air or compressed oil is injected to operate an annular piston accommodated therein, a slider coupled to the piston, and a link having one end connected at a pivot shaft to the slider and the other end connected to the clamp jaws via a slot and a pin.

This multi-jaw chuck can handle pipes of various diameters since the open/close width can be made larger easily by extending the sliding distance of the clamp jaws. The clamp jaws move in a direction perpendicular to the pipe when clamping the pipe, so that the jaws can clamp the pipe in surface contact or at least in line contact therewith and can hardly cause a dent or scar on the pipe.

CITATION LIST

Patent Literature

[PTL 1] Japanese Patent Application Laid-open No. H05-069373

[PTL 2] Japanese Patent Application Laid-open No. 2007-301664

SUMMARY OF INVENTION

Technical Problem

The problem with the chuck mechanism disclosed in PTL 2 is that it has a complex structure and the device tends to be bulky. The device is thus inherently prone to trouble. Another problem is that, when the chuck mechanism is to be designed to be rotated or moved, the requisite drive device will also be bulky.

The present invention was made in view of the problems encountered by the background art described above. An object of the present invention is to propose a chuck mechanism that enables downsizing of the device with a simple structure and has a wide open/close width of clamps to be able to handle pipes of various diameters, a chuck mechanism that can clamp a pipe in surface contact, or at least in line contact therewith, so that it can hardly cause a dent or scar on the pipe.

Solution to Problem

To achieve the object noted above, the present invention provides a chuck mechanism as set forth in the following (1) to (7).

(1) A chuck mechanism, including a horizontally arranged shaft; a frame provided at a distal end of the shaft and protruding in an up and down direction of the shaft; a pair of dog leg shaped link members each having a bent portion protruded inward, and swingably supported at the bent portions respectively on an upper part and a lower part of the frame; parallel link members each having a rear end rotatably supported on the frame so as to be parallel to each of front parts of the pair of dog leg shaped link members; a pair of clamp members having clamp surfaces arranged opposite each other and rotatably supported, respectively, at a distal end of the dog leg shaped link member and at a distal end of the parallel link member arranged parallel to the dog leg shaped link member on the upper part, and rotatably supported at a distal end of the dog leg shaped link member and at a distal end of the parallel link member arranged parallel to the dog leg shaped link member on the lower part; and a swing drive mechanism causing rear parts of the pair of dog leg shaped link members to swing in directions in which the rear parts move apart from and closer to each other.

(2) The chuck mechanism according to (1), wherein the clamp surfaces of the pair of clamp members are formed as V-shaped grooves.

(3) The chuck mechanism according to (1) or (2), wherein the swing drive mechanism includes short link members rotatably supported on respective rear ends of the pair of dog leg shaped link members, a connecting link member connecting the short link members, a cylindrical member provided to the connecting link member and fitted on the shaft to slide along the shaft, and an electric cylinder causing the cylindrical member to slide along the shaft.

(4) The chuck mechanism according to (3), wherein start-up, stop, forward rotation, reverse rotation, and torque of the electric cylinder are controlled by control means.

(5) The chuck mechanism according to any one of (1) to (4), wherein the chuck mechanism is provided with a rotary drive mechanism rotating the chuck mechanism around an axis of the shaft.

(6) The chuck mechanism according to any of (1) to (5), wherein the chuck mechanism is provided with a transfer drive mechanism causing the chuck mechanism to move along an axial direction of the shaft.

(7) The chuck mechanism according to any of (1) to (6), wherein the chuck mechanism is provided with a swivel drive mechanism swiveling the chuck mechanism around a vertical axis.

Advantageous Effects of Invention

The chuck mechanism according to the present invention described above performs opening/closing operations with the use of a specifically configured link mechanism, so that it enables downsizing of the device with a simple structure. The open/close width of clamps can be made larger easily by increasing the length of link rods, so that the mechanism can handle pipes of various diameters. The clamp surfaces of the pair of clamp members move parallel by way of a mechanism known as a parallel link, so that the clamp members can clamp the pipe in surface contact, or at least in line contact therewith, and a dent or scar can hardly be formed on the pipe.

DESCRIPTION OF EMBODIMENT

Hereinafter, one embodiment of chuck mechanism according to the present invention will be described in detail with reference to the drawings.

Figure 1:
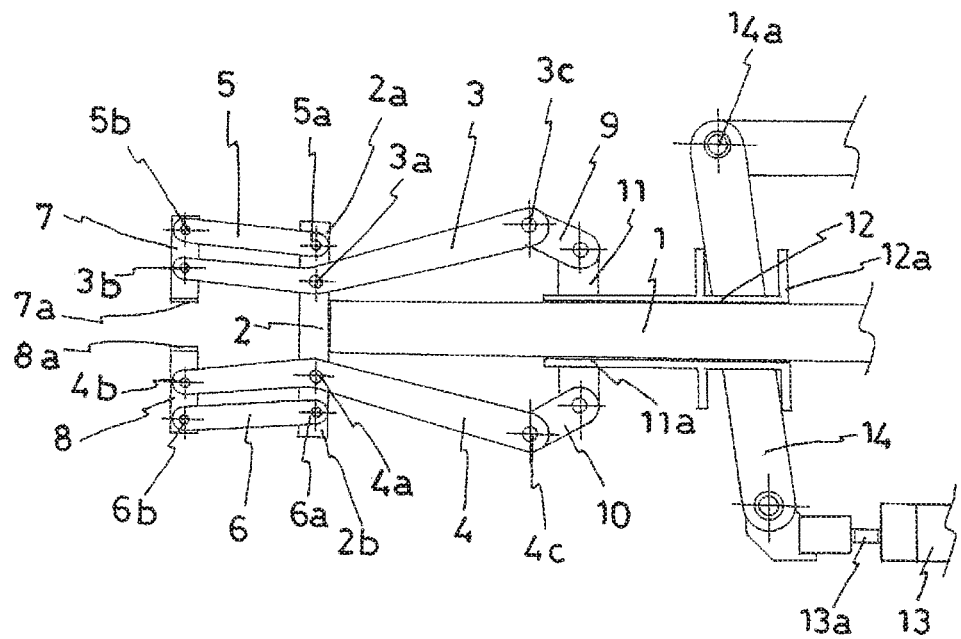
FIG. 1 is a conceptual diagram of major parts of one embodiment of chuck mechanism according to the present invention, or a side view illustrating a state in which the chuck mechanism is open.
Figure 2:
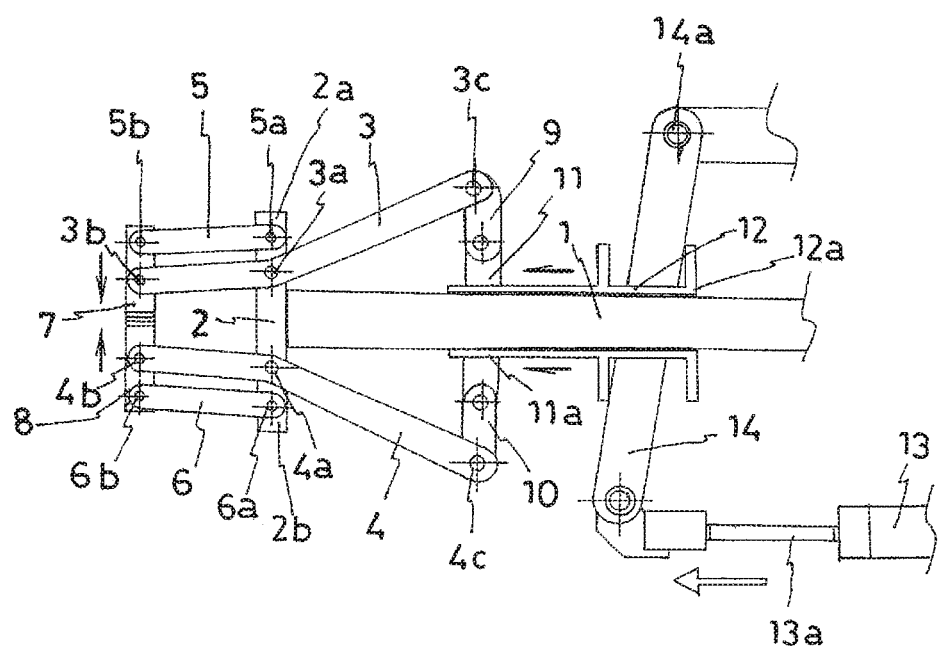
FIG. 2 is a conceptual diagram of major parts of one embodiment of chuck mechanism according to the present invention, or a side view illustrating a state in which the chuck mechanism is closed.

FIG. 1 and FIG. 2 are conceptual diagrams illustrating major parts of one embodiment of chuck mechanism according to the present invention. FIG. 1 and FIG. 2 are side views, respectively illustrating a state in which the chuck mechanism is open, and a state in which the chuck mechanism is closed.

In these drawings, reference numeral 1 denotes a shaft that is arranged horizontally, and 2 denotes a frame provided at a distal end of the shaft 1 and protruding in the up and down direction of the shaft 1. To an upper part 2a and a lower part 2b of the frame 2, are provided, respectively, a pair of dog leg shaped link members 3 and 4 having bent portions 3a and 4a protruded inward and swingably supported at the respective bent portions 3a and 4a, and at parallel link members 5 and 6 having respectively rear ends 5a and 6a rotatably supported on the frame 2 so as to be parallel to front parts of the pair of dog leg shaped link members 3 and 4, respectively.

Figure 3:
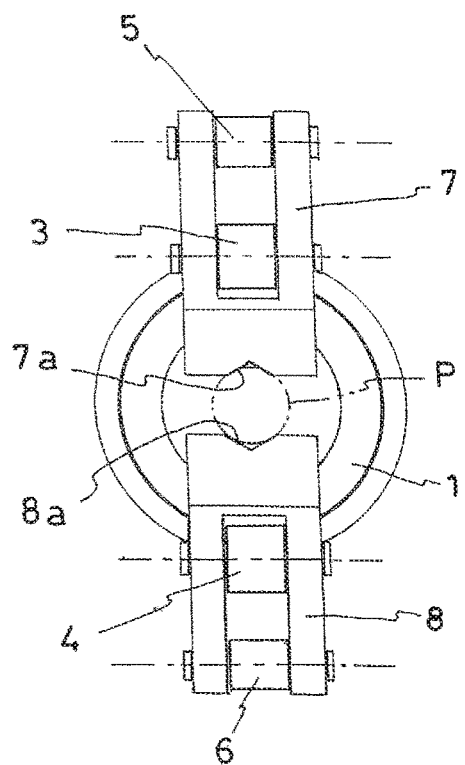
FIG. 3 is a conceptual diagram of major parts of one embodiment of chuck mechanism according to the present invention, or a front view illustrating a state in which a large-diameter pipe is clamped.
Figure 4:
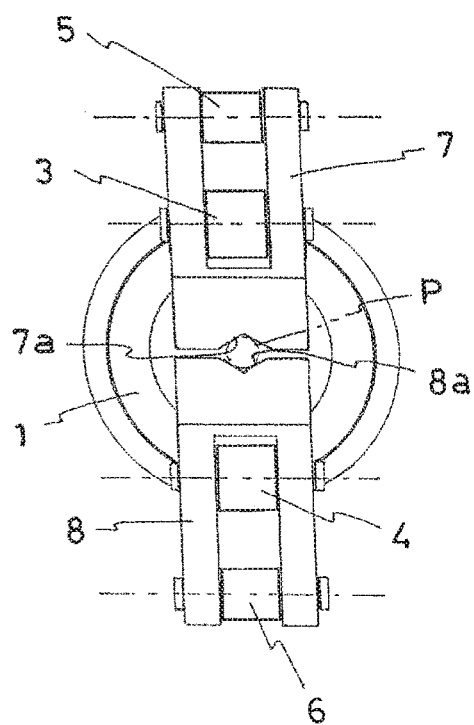
FIG. 4 is a conceptual diagram of major parts of one embodiment of chuck mechanism according to the present invention, or a front view illustrating a state in which a small-diameter pipe is clamped.

A pair of clamp members 7 and 8, arranged to have clamp surfaces 7a and 8a facing each other, are rotatably supported respectively at the distal end 3b of the dog leg shaped link member 3 on the upper part 2a of the frame 2 and the distal end 5b of the parallel link member 5 disposed parallel to the link member 3, and the distal end 4b of the dog leg shaped link member 4 on the lower part 2b of the frame 2 and the distal end 6b of the parallel link member 6 disposed parallel to the link member 4. The clamp surfaces 7a and 8a are formed as V-shaped grooves, as shown in FIG. 3 or FIG. 4.

Short link members 9 and 10 are rotatably supported at rear ends 3c and 4c of the pair of dog leg shaped link members 3 and 4, respectively. A connecting link member 11 is rotatably coupled to the short link members 9 and 10 to connect them. A cylindrical member 12 fitted on the shaft 1 and slides along the shaft 1 is fixedly attached to a central portion 11a of the connecting link member 11. An electric cylinder 13 is provided for causing the cylindrical member 12 to slide along the shaft 1.

The electric cylinder 13 includes a rod 13a that provides linear drive by rotation of a ball screw with the use of a stepping motor. The rod 13a causes a swing rod 14 having an upper end 14a rotatably supported at a fixed point to swing, and the swing motion of the swing rod 14 is received by a flange 12a provided on an outer periphery of the cylindrical member 12 so that the cylindrical member 12 slides along the shaft 1. Start-up, stop, forward rotation, reverse rotation, rotation speed, torque, etc. of the stepping motor that constitutes the electric cylinder 13 are controlled by way of control means (not shown), based on detection of pulses generated in accordance with the rpm with the use of an encoder and the like.

In the present invention, the short link members 9 and 10 rotatably supported respectively on the rear ends 3c and 4c of the pair of dog leg shaped link members 3 and 4, the connecting link member 11 connecting the short link members 9 and 10, the cylindrical member 12 provided to the connecting link member 11 and fitted on the shaft 1 to slide along the shaft 1, and the electric cylinder 13 for causing the cylindrical member 12 to slide along the shaft, may sometimes be referred to as a swing drive mechanism for swinging the rear parts of the pair of dog leg shaped link members 3 and 4 in directions in which the rear parts move apart from and closer to each other.

The chuck mechanism according to the present invention configured as described above clamps a pipe that is a workpiece as follows.

First, the electric cylinder 13 is driven to rotate forward by control means (not shown) to advance the rod 13a of the electric cylinder, so that the swing rod 14 swings forward around the fixed point at the upper end 14a. The swing motion of the swing rod 14 is received by the flange 12a provided on the outer periphery of the cylindrical member 12 so that the cylindrical member 12 is slid forward along the shaft 1. When the cylindrical member 12 slides forward, the connecting link member 11 fixed to the cylindrical member 12 moves forward to cause the rear parts of the pair of dog leg shaped link members 3 and 4 to swing around the bent portions 3a and 4a in directions in which they move apart from each other, via the short link members 9 and 10.

When the rear parts of the pair of dog leg shaped link members 3 and 4 swing in directions in which they move apart from each other, the front parts of the pair of dog leg shaped link members 3 and 4 swing around the bent portions 3a and 4a in directions in which they move closer to each other. This swing motion of the front parts of the pair of dog leg shaped link members 3 and 4 causes the pair of clamp members 7 and 8, which have the clamp surfaces 7a and 8a facing each other and are rotatably supported respectively at the distal end 3b of the dog leg shaped link member 3 and the distal end 5b of the parallel link member 5 disposed parallel to the link member 3, and the distal end 4b of the dog leg shaped link member 4 and the distal end 6b of the parallel link member 6 disposed parallel to the link member 4, to move in directions in which they approach as shown in FIG. 2 to clamp the pipe.

Since the upper part 2a of the frame 2, the front part of the dog leg shaped link member 3, the parallel link member 5, and the clamp member 7, and the lower part 2b of the frame 2, the front part of the dog leg shaped link member 4, the parallel link member 6, and the clamp member 8 each form a structure known as a parallel link, the clamp surfaces 7a and 8a remain parallel as the clamp members 7 and 8 approach each other to clamp the pipe. Therefore, they make surface contact, or at least line contact with the pipe when clamping the pipe, so that they will hardly cause a dent, scar, etc. on the pipe.

In the embodiment described above, the clamp surfaces 7a and 8a are formed as V-shaped grooves, so that the pipe moves along the V-shaped grooves of the clamp surfaces 7a and 8a when being clamped. Pipe centering has been achieved by the end of clamping so that the pipe can be clamped correctly. As shown in FIG. 3 and FIG. 4, pipes P of different diameters can be clamped from above and below uniformly in line contact at least at two locations, so that dents, scars etc. can hardly be formed on the pipe. Moreover, when the electric cylinder 13 that causes the clamp members 7 and 8 to approach each other via the link mechanism as described above is of a type that can control not only the start-up, stop, forward rotation, and reverse rotation but also the torque by way of control means, the chuck can clamp the pipe with an optimal clamping force in accordance with the pipe diameter and pipe material.

When releasing the pipe that has been clamped, the electric cylinder 13 is driven to rotate reversely by control means (not shown), so that the rod 13a of the electric cylinder moves backward. The link mechanism described above then moves in opposite directions from those mentioned above to cause the clamp members 7 and 8 to move apart from each other to release the pipe.

A rotary drive mechanism 20 may be provided to the chuck mechanism according to the present invention described above for rotating the horizontally arranged shaft 1 mentioned above around its axis.

Figure 5:
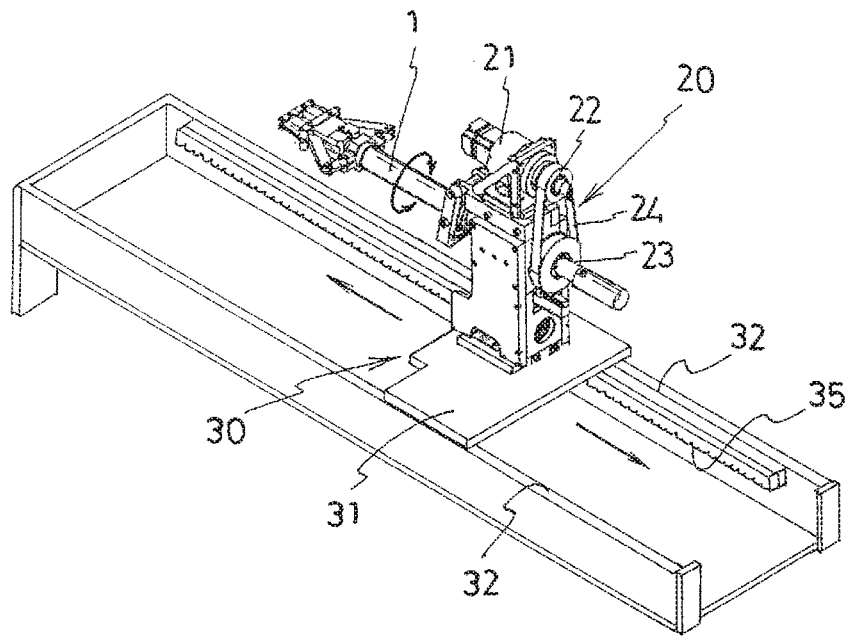
FIG. 5 is a perspective view illustrating one embodiment of chuck mechanism according to the present invention in its entirety.
Figure 6:
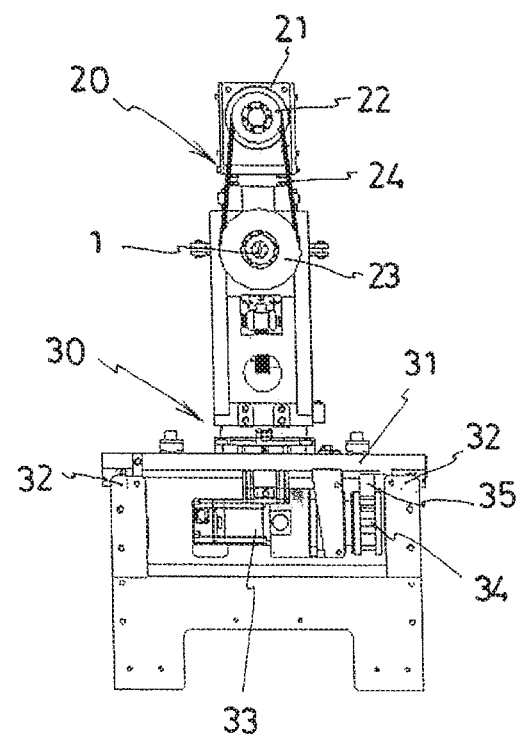
FIG. 6 is a backside view illustrating one embodiment of chuck mechanism according to the present invention in its entirety.

The rotary drive mechanism 20 may be configured as shown in FIG. 5 and FIG. 6, with a driving motor 21 set above the chuck mechanism. A pulley 22 mounted to a rotary shaft of the driving motor 21 and a pulley 23 provided to the shaft 1 of the chuck mechanism may be connected with a belt 24, so that, by rotating the driving motor 21, the shaft 1 is rotated around its axis, which in turn rotates the chuck mechanism provided at the distal end of the shaft 1.

With such a rotary drive mechanism 20 provided to the chuck mechanism, the pipe clamped by the chuck mechanism can be rotated around its axis, so that the pipe can be bent to any direction by means of a supplementary pipe bending machine.

Moreover, a transfer drive mechanism 30 may be provided to the chuck mechanism according to the present invention for moving the chuck mechanism along the axial direction of the shaft 1.

As shown in FIG. 5 and FIG. 6, the transfer drive mechanism 30 may be configured with a table 31 on which the chuck mechanism is placed, guide rails 32 that movably support the table 31, a feed motor 33 provided on the underside of the table 31, a drive pinion 34 mounted to a rotary shaft of the feed motor 33, and a rack member 35 that is provided parallel to the guide rails 32 and receives the drive force from the feed motor 33 as the drive pinion 34 meshes therewith to cause the table 31 to move along the guide rails 32.

With the transfer drive mechanism 30 described above provided to the chuck mechanism, the pipe clamped by the chuck mechanism can be moved along its axial direction, so that the pipe can be bent or cut at any position by means of a supplementary pipe bending machine or cutting machine.

Furthermore, a swivel drive mechanism 40 may be provided to the chuck mechanism according to the present invention for swiveling the chuck mechanism around a vertical axis.

Figure 7:
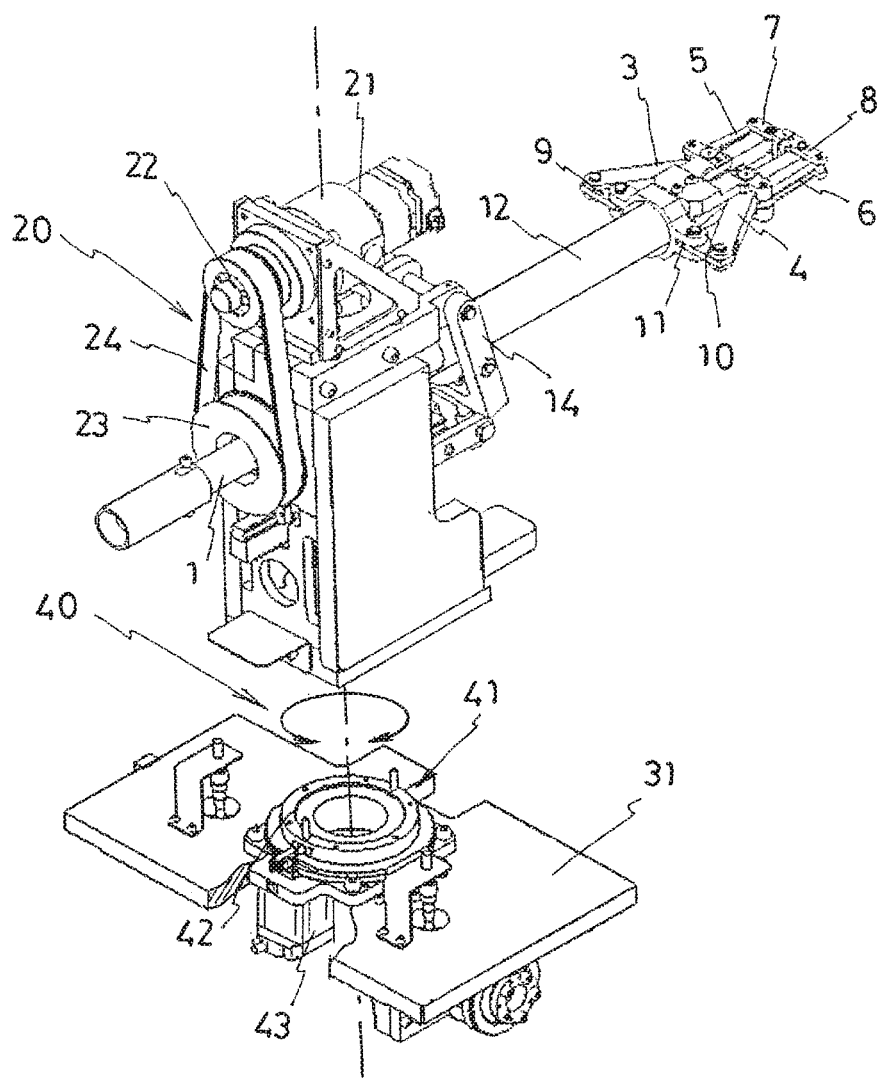
FIG. 7 is an exploded perspective view illustrating a swivel drive mechanism in one embodiment of chuck mechanism according to the present invention.

As shown in FIG. 7, the swivel drive mechanism 40 may be configured as a hollow rotary actuator 41 interposed between the chuck mechanism and the table 31 the former is placed on, so that the hollow rotary actuator 41 directly swivels the chuck mechanism around a vertical axis. For the hollow rotary actuator 41, a device that has a hollow rotary table 42 and a stepping motor 43 for rotating the hollow rotary table 42 integral with the former may be used.

With the swivel drive mechanism 40 described above provided to the chuck mechanism, the chuck mechanism can be swiveled around a vertical axis, so that various operations are possible such as retrieving a pipe to be processed, or discharging a processed pipe to a discharge chute on one side, etc.

While one embodiment of the chuck mechanism according to the present invention has been described, it goes without saying that the present invention is not limited to the embodiment described above and various modifications and changes are possible.

For example, the swing drive mechanism for swinging the rear parts of the pair of dog leg shaped link members 3 and 4 shown in the embodiment above is only one example. The present invention can adopt swing drive mechanisms of various configurations, as long as the mechanism can swing the rear parts of the pair of dog leg shaped link members 3 and 4 to move them apart from or closer to each other.

The configurations of the rotary drive mechanism 20 for rotating the chuck mechanism around the axis of the shaft 1, the transfer drive mechanism 30 for moving the chuck mechanism along the axial direction of the shaft 1, and the swivel drive mechanism 40 for swiveling the chuck mechanism around the vertical axis shown in the embodiment above are only examples, and the present invention shall not be limited in any way by these configurations.

INDUSTRIAL APPLICABILITY

The chuck mechanism according to the present invention described above enables downsizing of the device with a simple structure and has a wide open/close width of clamps so that it is capable of handling pipes of various diameters.

The chuck mechanism can clamp pipes in surface contact or at least in line contact therewith, so that it hardly causes a dent, scar, etc. on the pipe. Therefore, the chuck mechanism is widely applicable as a device that clamps a pipe when cutting or bending the pipe.

REFERENCE SIGNS LIST

1 Shaft
2 Frame
2a Upper part of frame
2b Lower part of frame
3, 4 Pair of dog leg shaped link members
3a, 4a Respective bent portions of the pair of dog leg shaped link members
3b, 4b Respective distal ends of the pair of dog leg shaped link members
3c, 4c Respective rear ends of the pair of dog leg shaped link members
5, 6 Parallel link member
5a, 6a Respective rear ends of parallel link members
5b, 6b Respective front ends of parallel link members
7, 8 Pair of clamp members
7a, 8a Respective clamp surfaces of the pair of clamp members
9, 10 Short link member
11 Connecting link member
11a Central portion of connecting link member
12 Cylindrical member
12a Flange provided on outer periphery of cylindrical member
13 Electric cylinder
13a Rod of electric cylinder
14 Swing rod
14a Upper end of swing rod
20 Rotary drive mechanism
21 Drive motor
22, 23 Pulley
24 Belt
30 Transfer drive mechanism
31 Table
32 Guide rail
33 Feed motor
34 Drive pinion
35 Rack member
40 Swivel drive mechanism
41 Hollow rotary actuator
42 Hollow rotary table
43 Stepping motor

The invention claimed is:

1. A system comprising:
a chuck mechanism and a swivel drive mechanism;
the chuck mechanism comprising:
a horizontally arranged shaft;
a frame provided at a distal end of the shaft and extending transversely to a longitudinal axis of the shaft, the frame inducting opposing ends provided on opposite sides of the longitudinal axis of the shaft;
a pair of link members each having a bent portion protruding inwardly toward the longitudinal axis of the shaft and being swingably supported at the bent portions respectively on opposite sides of the frame, and each of the link members having a front part and a rear part extending from the bent portion;
parallel link members each having a rear end rotatably supported on the opposite sides of the frame and each extending parallel to one of the front parts of the pair of link members;
a pair of clamp members having clamp surfaces arranged opposite each other, each clamp member being rotatably supported at a distal end of one of the link members and at a distal end of one of the parallel link members;
the swing drive mechanism configured to swing the rear parts of the pair of link members in directions where the rear parts move apart from and closer to each other, wherein
the swing drive mechanism comprises a cylindrical member fitted on and sliding along an outer surface of the shaft in the longitudinal axis of the shaft and having connecting link members extending outwardly, short link members extending between and rotatably coupled to respective rear ends of the pair of link members and to the connecting link members, and an electric cylinder configured to slide the cylindrical member along the shaft, and
a swing rod having a lower end, an upper end and a midpoint;
the electric cylinder includes a rod that drives lineally a the lower end of the swing rod having the upper end rotatably supported at the midpoint, swing motion of the swing rod is received by a flange provided on an outer periphery of the cylindrical member so that the cylindrical member slides along the shaft.

2. The system according to claim 1, wherein the clamp surfaces of the pair of clamp members are formed as V-shaped grooves.

3. The system according to claim 1, wherein start-up, stop, forward rotation, reverse rotation, and torque of the electric cylinder are controlled by control means.

4. The system according to claim 1, wherein the system is provided with a rotary drive mechanism rotating the chuck mechanism around the longitudinal axis of the shaft.

5. The system according to claim 1, wherein the system is provided with a transfer drive mechanism causing the chuck mechanism to move along an axial direction of the shaft.

6. The system according to claim 1, wherein the system is provided with a swivel drive mechanism swiveling the chuck mechanism around a vertical axis.

* * * * *